United States Patent Office 3,554,638
Patented Jan. 12, 1971

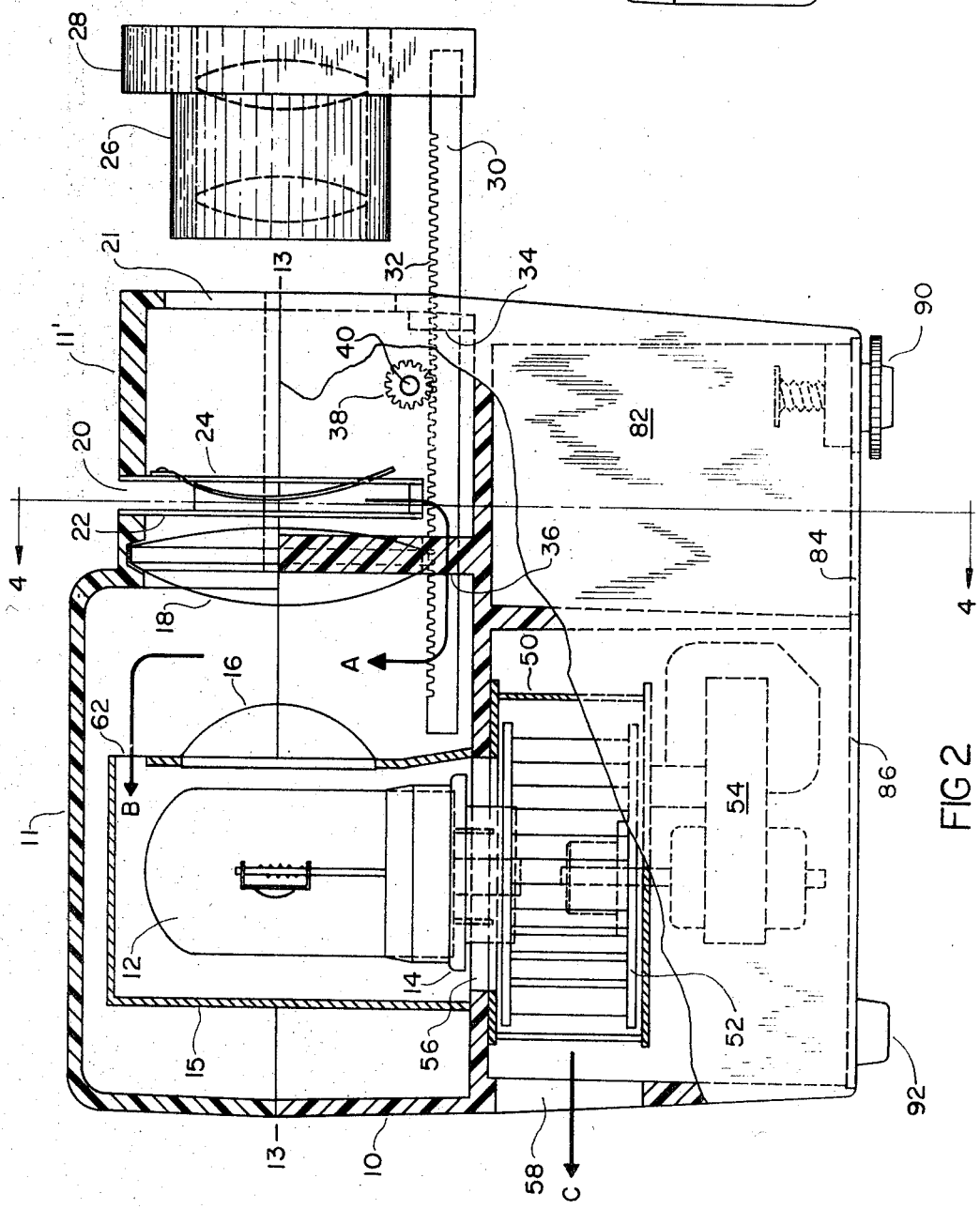

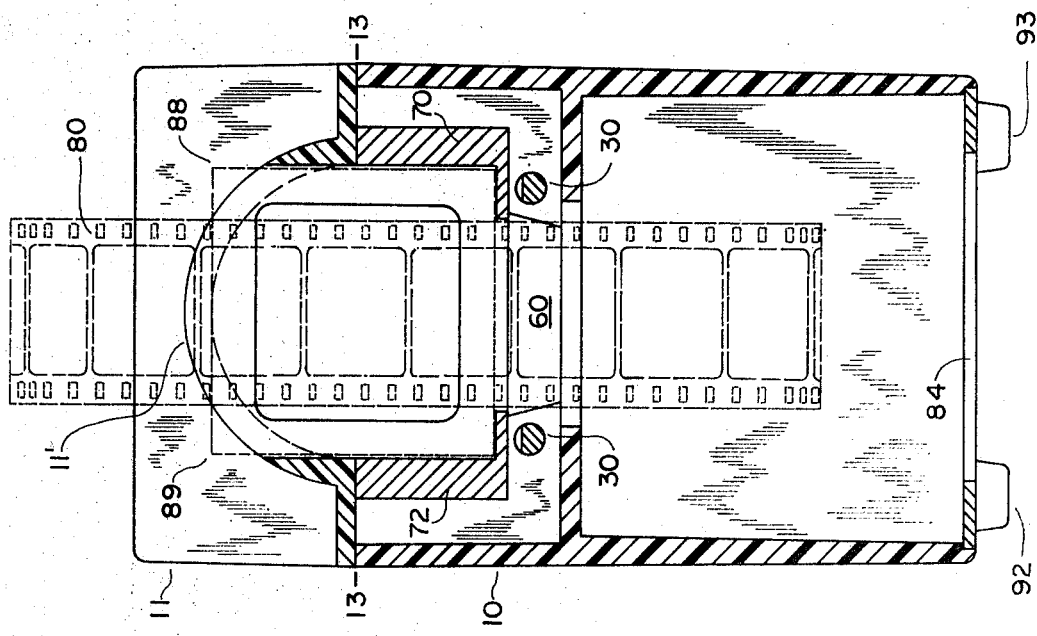
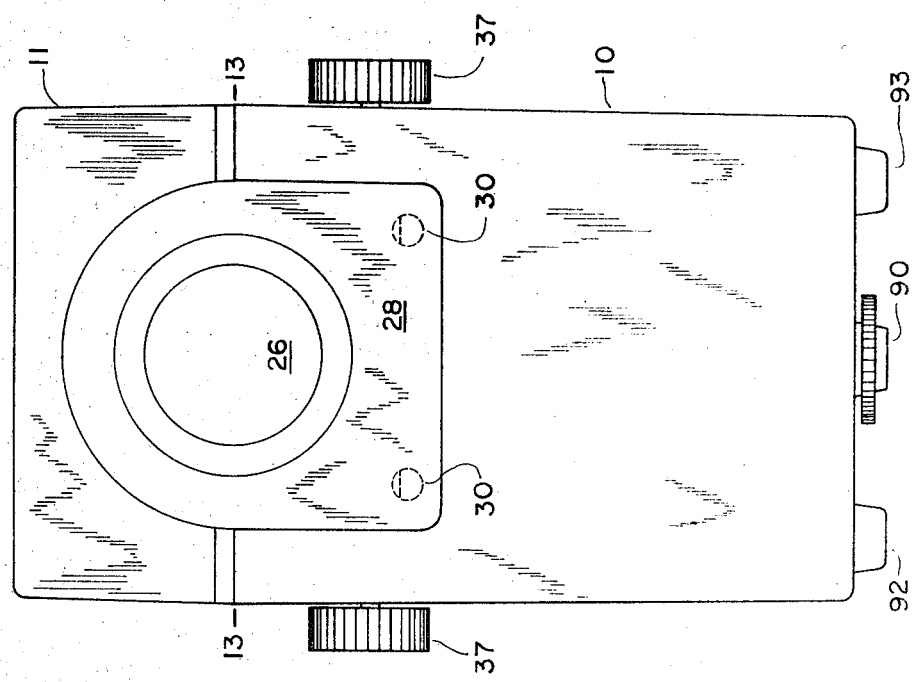

3,554,638
SMALL SLIDE AND FILM-STRIP PROJECTOR
Panayotis Constantine Dimitracopoulos, 3435 Drummond
St., Suite 26, Montreal, Quebec, Canada
Filed Apr. 19, 1968, Ser. No. 722,774
Int. Cl. G03b 21/00
U.S. Cl. 353—68                                             3 Claims

ABSTRACT OF THE DISCLOSURE

A blower-cooled slide and film-strip projector having an adjustable projection lens module mounted on toothed racks for extension during projection and retraction, within the projector housing, during storage. The projector has a slot at the upper forward portion of its housing for the manual insertion and removal of individual slides and film-strips into and out of a support assembly.

FIELD OF INVENTION

This invention relates to slide and film-strip projectors of maximum projection brightness combined with minimum size and weight.

DESCRIPTION OF PRIOR ART

One may classify slide projectors in two major categories. Automatic and non-automatic. Automatic slide projectors usually employ a magazine (or tray) for the storage of the individual slides, from which they are removed by automatic mechanisms for their sequential projection. The non-automatic projectors require the operator to insert and remove individual slides, one by one, in and out of the machine.

The automatic variety is evidently more complex, but the complexity pertains only to the mechanical, slide-changing elements and has nothing to do with the optical system itself. Nevertheless, it has become the practice to include better optical systems in the automatic machines and to build the non-automatic projectors with poor quality optics, insufficiently bright illumination sources and inadequate cooling and ventilation systems. The designation "non-automatic" has thus become synonymous with cheap and poor quality machines, but evidently, this need not necessarily be so. In fact, there are many applications where the operator requires a light, compact, non-automatic slide projector having optics and brilliancy equivalent to the automatic variety, but he is usually frustrated in his search for such an apparatus.

OBJECTS OF THE INVENTION

It is therefore the object of the present invention to provide a novel, non-automatic, slide projector combining excellent optics, brilliant images, cool operation, with compactness, small size and light weight.

It is a further object of the present invention to arrange the optics and a turbine blower in such a manner that the air-flow pattern is controlled for maximum cooling efficiency.

It is still a further object of the present invention to provide a housing of unitary design and great simplicity, the housing providing the support for substantially all optics and other components.

A still further object is to build the projection lens system in a manner permitting its retraction within the housing, when the projector is not in operaion and thus obtain maximum compactness.

Other objects of the invention will become evident from the ensuing description, illustrations and claims.

SUMMARY

A small, compact, slide and film-strip projector, built in a cast or molded housing formed with bosses and walls that support the major optical and other components, including a motor-driven turbine blower, and having its projection lens assembly supported on two shafts, formed with teeth engageable with a focusing pinion, the two shafts permitting the adjustment of the projection lens assembly to a considerable distance away from the housing for focusing.

BRIEF DESCRIPTION OF THE DRAWINGS

FIG. 1 is a side elevation of one preferred embodiment of the present invention, showing the projection lens retracted within the housing.

FIG. 2 is a side elevation of the projector of FIG. 1, with the projection lens extended beyond the housing and with the exterior of the housing and some internal parts broken away.

FIG. 3 is a front elevation of the projector of FIGS. 1 and 2.

FIG. 4 is a sectional view of the projector taken along line 4—4 of FIG. 2.

FIG. 5 is a projector similar to that of FIG. 1, except that the projection lens module and its focusing arrangement is different, and the overall length of the projector is increased.

DESCRIPTION OF THE PREFERRED EMBODIMENTS

The invention will now be described by reference to certain presently preferred embodiments thereof, but it will be understood by those skilled in the art that the principles of the invention can be carried out by specifically different physical devices, and that in using words of limited meaning for the better understanding of the particulars of the forms chosen for description and illustration, it is not intended to exclude variations of those details which properly fall within the scope of the invention in its broader aspects.

Referring to the accompanying drawings, FIGS. 1, 2, 3 and 4, illustrate one very useful and compact format which the projector may take. The projector frame and housing may be in two segments, designated as 10 and 11, meeting along plane 13—13. The optical projection axis may also lie on this plane 13—13. The upper forward portion of the ceiling of the projector, designated by numeral 11', is of particular interest and importance, as it will become evident below, and it may be an integral part of segment 11, segment 10 (the main projector frame and housing), or it may be a separate part, preferably mounted in a permanent manner on the main frame and housing 10. This projector frame and housing is preferably of cast metal or plastic and is formed in such a way that it supports practically all optical and mechanical elements. The projector lamp 12 is inserted in and is firmly held in place by the lamp-socket 14 mounted on frame 10. The usual condensing lens 18 is also supported by an appropriate extension of the frame, as illustrated in the drawings, while condensing lens 16 may be supported by chimney 15. A slot 20 is formed on the ceiling portion 11', this slot being above, and in direct communication with, the slide and film-strip support assembly of the projector. Individual slides and film-strips may be thus inserted through the slot into this support assembly, which supports them and guides them in the proper projection position. A convenient and very useful arrangement of such a support assembly is the following: Two plate-like members, 22 and 24 (FIG. 2) are held apart, for example by means of spacers 70 and 72 (FIG. 4), and are formed with appropriate windows through which the projection light rays may freely pass onto the projection lens module 26, carried by the projection lens mount 28. Spacers 70 and 72 may be substantially L-shaped, as shown in FIG. 4, and thus:

(a) Their vertical portions may guide the edges of a slide, within the support assembly.

(b) Their lower (or horizontal) poritons provide very convenient stop means for limiting the insertion of slides only to the desired proper depth, so that their transparency is properly aligned with the optical projection axis.

(c) As shown in FIG. 4, the length and spacing of the lower (horizontal) portions of brackets 70 and 72 is adjusted so that an opening remains between them (this opening being thus directly opposite of slot 20), to allow free passage of a film-strip therethrough. Such a film-strip 80 is shown, in dotted lines, in FIG. 4, and to facilitate the removal of such film-strip from chamber 82 (chamber 82 being the lower, forward compartment of this projector), an opening or window 84 exists in the lower cover 86.

(d) The opening thus formed between plates 22 and 24 and spacers 70 and 72, as abovedescribed in (c), also allows cool air to pass in the direction of arrow A (see FIG. 2) to cools-off the projected transparencies, and thus this opening further contributed to the overall efficient air-circulation and cooling of the projector.

While the upper part or segment 11 may be substantially rectangular in cross-section as illustrated, or have any other desired shape, the upper, forward portion of the ceiling 11', and more particularly, its part immediately surrounding the slot 20 (i.e. the segment of the ceiling 11' directly over the abovedescribed support assembly) has such a shape that at least two corners of a slide (such as 88 and 89 in FIG. 4) always protrude over and above its surface, to enable the operator to insert and remove slides by gripping them between two fingers from these two corners 88 and 89. For this purpose, a curved surface of ceiling 11' around the slot 20, as shown in the drawings, is the most convenient. But it is evident that any geometric shape that allows at least two corners of a slide (such as 88 and 89 of FIG. 4) to remain exposed and accessible to the operator's two fingers, when such a slide is properly nested for projection in the support assembly, is equally acceptable. From the above description it can be seen that the arrangement of plates 20 and 22 and the L-shaped spacers 70 and 72, constitutes a very convenient and practical slide and film-strip support assembly. But it is evident that the "pocket-like" configuration of such a support assembly may be constructed in several other ways, for example, it may be formed out of one or more cast, molded, or otherwise fabricated parts, which in turn may be—optionally—an integral part of the housing 10 or the ceiling 11', but whatever construction is chosen for such support assembly, it must incorporate slide-guiding means, stop-means for limiting the insertion of slides only partway into the support assembly, as well as an opening of sufficient and appropriate size to allow free passage of a film-strip, in the abovedescribed fashion. As long as these requirements are met, members 20, 22, 70 and 72 may have any convenient shape, for example, spacers 70 and 72 need not necessarily be L-shaped, and any shape or even any number of parts offering slide and film-strip guiding means, as well as slide-limiting stop means is equally acceptable. Two shafts 30, formed with teeth 32 (or racks) are embedded in the lens mount 28, and passing through appropriate openings 34 and 36 of frame 10, adjustably support the lens mount. The adjustment is made by means of pinion 38 which engages the toothed shafts or racks 30. Pinion 38 is supported on shaft 40, which is journalled in openings of the frame 10, and a knob 37 (or two, one on each side of frame 10) is secured on shaft 40, through which the pinion may be turned by the operator, advancing, retracting and thus focusing the projection lens 26. It is evident that when not in operation, the lens 26 may be completely retracted inside the frame or housing 10 and thus achieve maximum compactness.

The projector lamp 12 may be of any desired type or shape, but at any rate it may be of high wattage and, therefore, of considerable illuminating capacity. Since high power lamps generate large amounts of unwanted heat that may damage the equipment and particularly the slides, adequate cooling is provided in the following way. Directly under the projection lamp socket an air turbine housing 50 is mounted, inside which the turbine 52 rotates, coupled to the rotor of the electric motor 54, and thus draws air from inside the chimney 15, through opening 56 at the lamp base. The air is exhausted through frame window 58, in the direction of arrow C.

As previously stated it is advisable to circulate air around all optical parts and the slide, in order to cool them and this is achieved by providing windows and openings in the frame and elsewhere, namely a window 60 (see FIG. 4) under condensing lens 18, and an opening 62 at the top of chimney 15. Thus cool air enters through slide-slot 20 and front hole 21 (and cools the slide), proceeds through openings 60 and 62 in the direction of arrows A and B (cooling the condensing lenses 18 and 16), is drawn by the turbine 52 and exhausted in the direction of arrow A (cooling the projection lamp 12).

For maximum cooling efficiency the speed, volume, and direction of airflow must be controlled, and thus the openings (or windows) 60 and 62, the cross-section of the chimney 15, and the size of the turbine intake 56, must be carefully designed as to position and size, and in doing so, the size, shape and velocity of turbine 52 and the parameters of its associated housing (including the expansion rate of its scroll) must be taken into account. When all these values have been optimized, it is surprising to see how much the illuminating efficiency of the projector can be increased, while keeping the housing very small compact, and cool.

It must be noted that in the projector of the present invention, the above-named design considerations can be realized by adjusting the design parameters without additional and costly mechanical members, but simply by varying the positions, sizes and shapes of the baffles and walls, most of which are an integral part of the frame or housing itself. Great economies may thus be realized and therefore this projector, although small and compact, can be advantageously compared, as to projection efficiency, with the large, heavy and expensive automatic ones.

Legs 93 and 92 and adjustable leg 90 may be attached, if desired, to the bottom cover 86.

FIG. 5 illustrates a projector similar to that illustrated in FIGS. 1 to 4 inc., but having a more conventional projection lens arrangement. The projection lens barrel is, for example, threaded as shown and a corresponding collar at the front of the housing supports it while it permits its gradual withdrawal for focusing. The threads are not, of course, essential and other focusing arrangements, for example a rack-and-pinion, may be used instead. However, the embodiment of FIG. 5, is useful when:

(1) A projection lens of very short focal length is employed, or (2) The overall length of the projector is substantially increased.

The most often used projection lenses have a focal length of 3 to 4 inches. When such a lens is used with the arrangement of FIGS. 1 to 4, the projection lens must be extended to a distance equivalent to about one-half the overall length of the projector. Therefore, the housing of the projector of FIG. 5 must be considerably elongated, as shown in this illustration. It now becomes evident how the focusing arrangement of FIGS. 1 to 4 contributes greatly to the overall compactness of the projector.

The overall shape of the housing of the projectors, the shape of the projection lens module 26, and the projection lens mount 28, may vary according to aesthetic and design requirements and the actual shapes shown in the figures are for illustrative purposes only.

The spacing, size and shape of the two shafts 30 may also vary, for example, the term "shaft" is not intended to exclude rectangular, oval or other cross-sections, and a circular cross-section has only been shown in the figures as an illustration. While it may be better to form both shafts 30 with racks, it is also evident that only one shaft need be formed with such a rack.

An air turbine, generally shown in the figures as one of the squirrel-cage blower type, was chosen due to its efficiency in moving large quantities of air. It is of course evident that other types of blowers and fans can be used, depending on the required heat dissipation, overall compactness of the projector and economics and design parameters.

The invention has been described by reference to certain preferred embodiments thereof, however, it will be understood that the principles of the invention can be carried out by various modifications, within the spirit of the invention, and therefore it is not intended to exclude variations and details which properly fall within the scope of this invention.

What is claimed is:

1. A slide and film-strip projector comprising a housing containing optical projection means within said housing including a projection lamp, a condensing lens system, a slide and film-strip support assembly and a projection lens module; said housing having a ceiling portion extending above said support assembly formed with a slot therethrough, said slot communicating with said support assembly for enabling slides and film-strips to be inserted in said support assembly for projection, said support assembly having an opening opposite said slot to allow free passage of film-strips therethrough, and stop means adjacent said opening for limiting the insertion of slides partway therein in such a fashion that two of their corners always remain protruding over and above said ceiling portion for facilitating the manual insertion of said sliders into projection position and their removal thereafter; said projection lens module being mounted on two shafts slidably supported in said housing, at least one of said shafts formed with a toothed rack engageable with a pinion in the housing, said pinion being rotatable by knob means operationally connected to said pinion for adjustably moving said lens module beyond said housing for focusing purposes and thereafter retracting said lens module substantially within said housing when the projector is not in operation; and a motor-driven blower mounted substantially below said projection lamp in order to withdraw heated air from, and discharge it outside of, said housing.

2. A slide and film-strip projector according to claim 1, wherein said support assembly includes two vertically spaced-apart plates formed with windows aligned with the optical projection axis, said stop means being spaced apart to allow free passage of film-strips therebetween and through said support assembly, while limiting and controlling the insertion of slides which are wider than said film-strips.

3. A slide and film-strip projector according to claim 1, wherein said housing comprises four side-walls, an open top, an open bottom, and a separation substantially perpendicular to said four side-walls and substantially midway between said open top and said open bottom, said separation substantially dividing said housing into upper and lower compartments, said upper compartment being at least partially covered by said ceiling portion, and containing said optical projection means, said separation being formed with an opening substantially under said projection lamp and in alignment with the air-intake of said blower, said lower compartment being at least partially covered by a floor.

References Cited
UNITED STATES PATENTS

| | | | |
|---|---|---|---|
| 1,966,531 | 7/1934 | Tint | 352—202(X) |
| 2,360,215 | 10/1944 | Falck | 355—63 |
| 3,028,788 | 4/1962 | Zillmer | 353—57 |
| 3,185,028 | 5/1965 | Andreoli | 240—47(X) |
| 3,187,173 | 6/1965 | Foley | 353—57 |
| 3,338,132 | 8/1967 | Ruhle | 352—202(X) |

JOHN M. HORAN, Primary Examiner

R. M. SHEER, Assistant Examiner

U.S. Cl. X.R.

353—57, 95